May 3, 1960

G. E. SUDEROW 2,934,804

RELEASABLE GRIPPER FOR JACK ASSEMBLIES

Filed March 17, 1955

INVENTOR
GEORGE E. SUDEROW

BY

ATTORNEYS

May 3, 1960

G. E. SUDEROW 2,934,804

RELEASABLE GRIPPER FOR JACK ASSEMBLIES

Filed March 17, 1955

INVENTOR
GEORGE E. SUDEROW

BY
*Cushman Darby Cushman*
ATTORNEYS

May 3, 1960   G. E. SUDEROW   2,934,804
RELEASABLE GRIPPER FOR JACK ASSEMBLIES
Filed March 17, 1955   6 Sheets-Sheet 3

INVENTOR
GEORGE E. SUDEROW
BY
ATTORNEYS

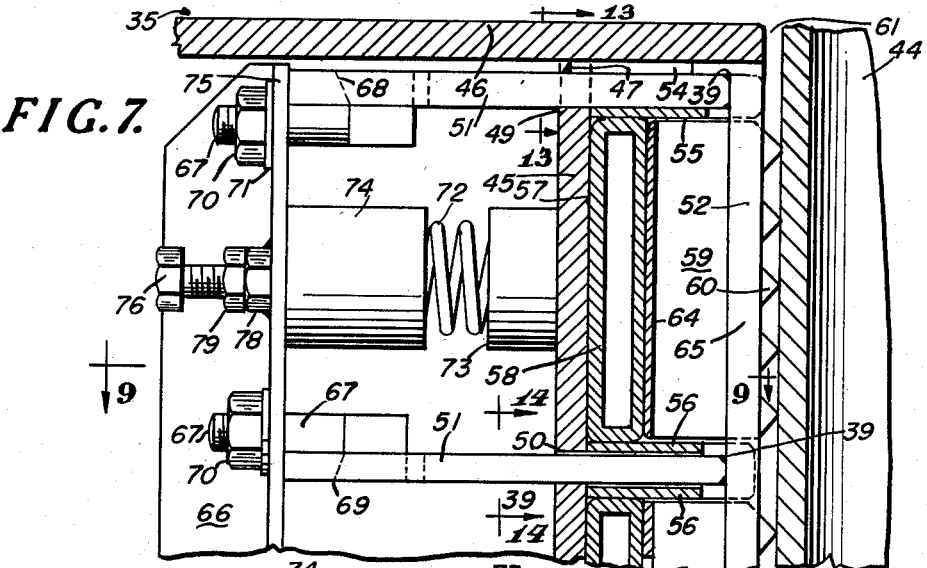
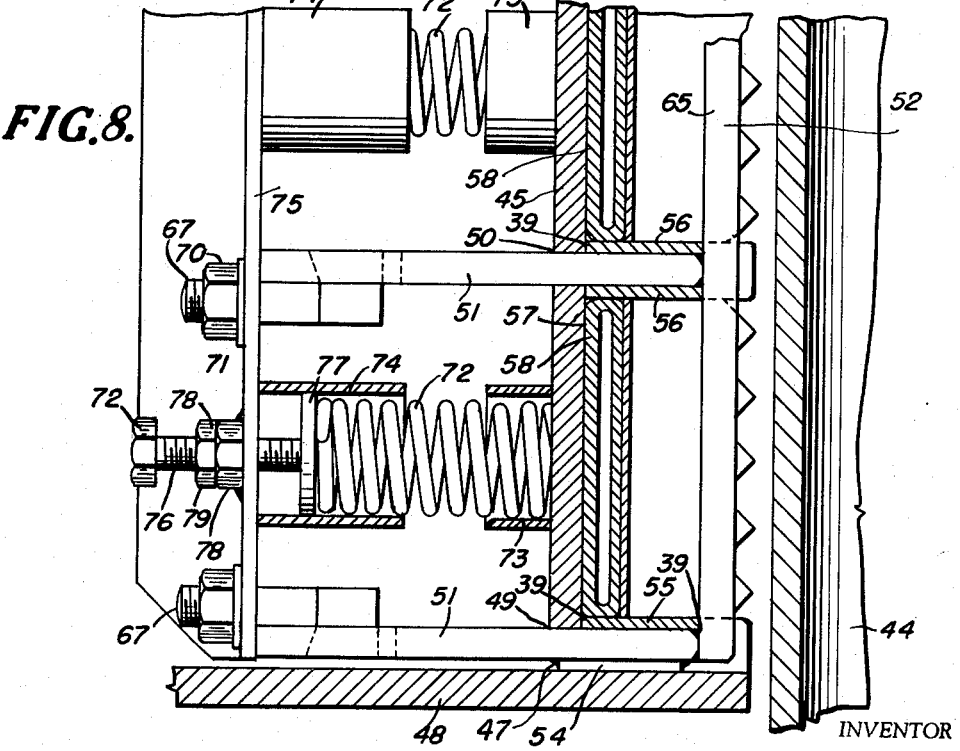

May 3, 1960

G. E. SUDEROW 2,934,804

RELEASABLE GRIPPER FOR JACK ASSEMBLIES

Filed March 17, 1955

INVENTOR
GEORGE E. SUDEROW

BY
*Cushman Darby Cushman*
ATTORNEYS

May 3, 1960　　　　　G. E. SUDEROW　　　2,934,804
RELEASABLE GRIPPER FOR JACK ASSEMBLIES
Filed March 17, 1955　　　　　　　　　　　6 Sheets-Sheet 6

INVENTOR
GEORGE E. SUDEROW
BY
ATTORNEYS

United States Patent Office 2,934,804
Patented May 3, 1960

2,934,804

RELEASABLE GRIPPER FOR JACK ASSEMBLIES

George E. Suderow, New York, N.Y., assignor to De Long Corporation, New York, N.Y., a corporation of Delaware Application March 17, 1955, Serial No. 495,003

4 Claims. (Cl. 24—263)

The present invention relates to an improved gripper assembly arranged to be associated with land or marine columns, poles, posts, uprights, caissons and the like, for releasably connecting a base or platform to the column. This application which is a continuation-in-part of my copending application, Serial No. 382,948, filed September 29, 1953, now Patent No. 2,873,580, is directed to an improved jack mechanism in which metal face tooth grippers are associated with the jack and positioned in front of the inflatable or rubber expander members so that when these members are inflated, the tooth grippers are forced into firm contact with the caisson and when the inflatable members are deflated, the tooth grippers are retracted and moved away from the caisson.

A further object consists in providing a jack assembly in which rigid or metal face tooth grippers are forced into contact with the caisson by inflatable members and the gripper or shoes are moved away from the caisson when the inflatable members are deflated by yieldable means, so as to insure the insertion of the caisson through the jack assembly and the floating barge or the withdrawal of the caisson therefrom, without accidentally contacting the teeth of the grippers.

A further object consists in associating with the jack assembly, inflatable members for engaging the caissons while being towed from place to place and for releasably holding the caissons prior to the latter being dropped in engagement with the marine ground, thus providing means for insuring the efficient operation of the metal face tooth grippers which, if moved into engagement with the caisson when transporting the same, might not only cause damage to the caisson but also dull the teeth of the grippers. The caisson engaging inflatable members are retracted to an inoperative position away from the caissons during the operation of the jack assembly to raise or lower the caissons or when the barge is moved vertically relative to the caissons.

Other objects and advantages of the invention will become apparent from the following description when taken in conjunction with the accompanying claims and drawings.

Referring to the drawings in which are shown several embodiments the invention may assume:

Figure 7 is an enlarged fragmentary sectional side view of the upper portion of the upper gripper assembly shown in Figure 6 and with the metal face tooth grippers in engagement with the caisson;

Figure 8 is a view similar to Figure 7 of the lower gripper assembly shown in Figure 6, with the metal face tooth grippers in their retracted position;

Figure 1:
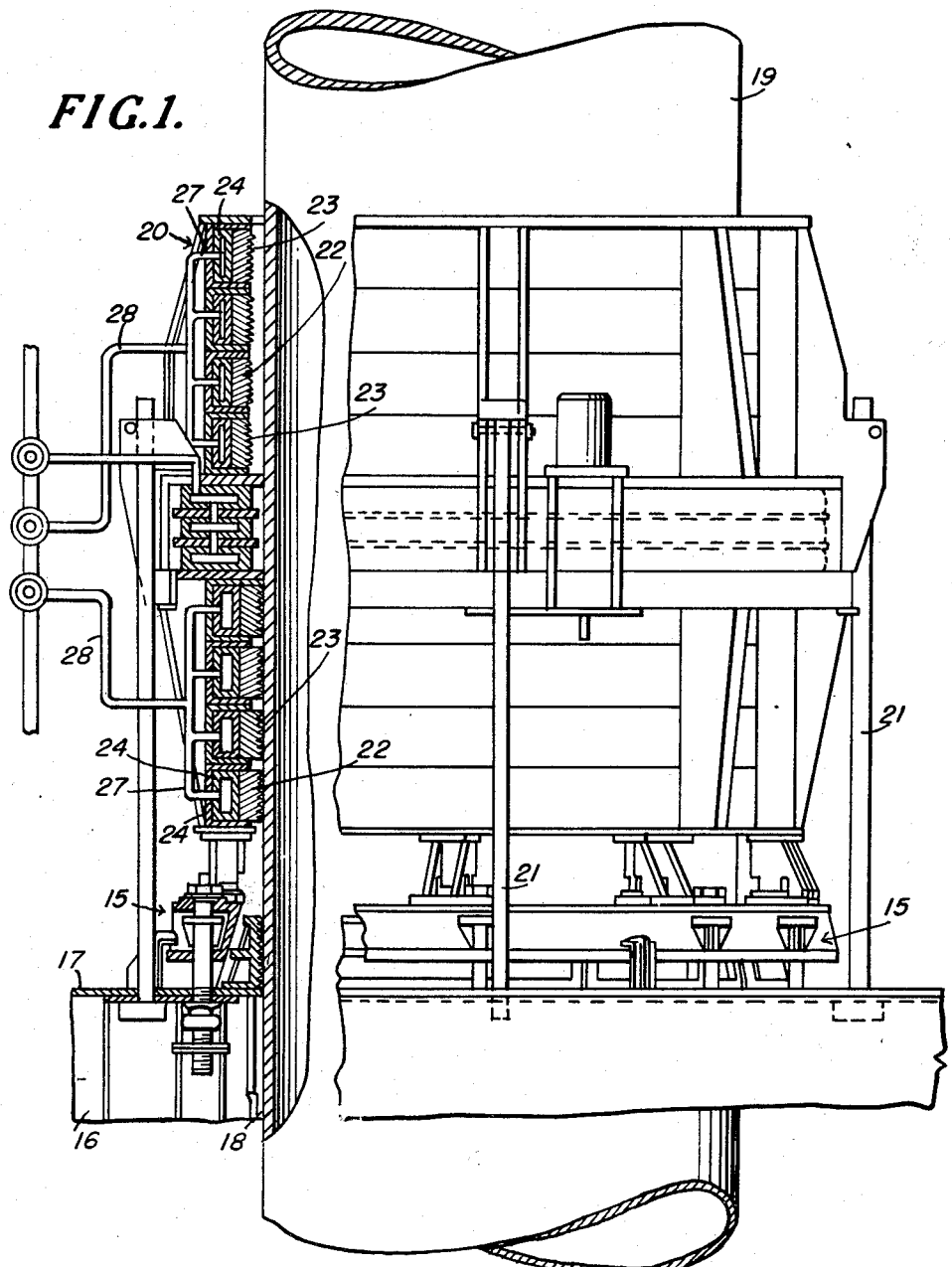
Figure 1 is an elevational view with parts in section, showing a jack mechanism constructed in accordance with the present invention and associated with a caisson or tubular column.

Referring to the drawings, the improved gripper or locking assembly generally indicated by the numeral 15 and which is protected in my copending application, Serial No. 382,948, filed September 29, 1953, is shown associated with a floating barge 16 having its deck or working platform 17 provided with spaced vertical openings 18 (Fig. 1) through each of which extends a caisson 19 or other suitable supporting column 19 which may be driven into the ground or withdrawn therefrom in any suitable manner, preferably by the hydraulic jack mechanism 20, detachably connected to the deck 17 by the bolts 21. The jack mechanism 20 is substantially similar in construction and operation to the hydraulic jack embodied in the Pointer application, Serial No. 283,567, filed April 22, 1952, now Patent No. 2,775,869, but essentially distinguishes therefrom by providing metal grippers or shoes 22 having teeth or serrations 23 positioned in front of the inflatable members or rubber expanders 24, so that when these members are inflated, the metal face tooth grippers 22 are forced into tight frictional contact with the caissons in the manner and for the purpose subsequently to be described.

Figure 2:
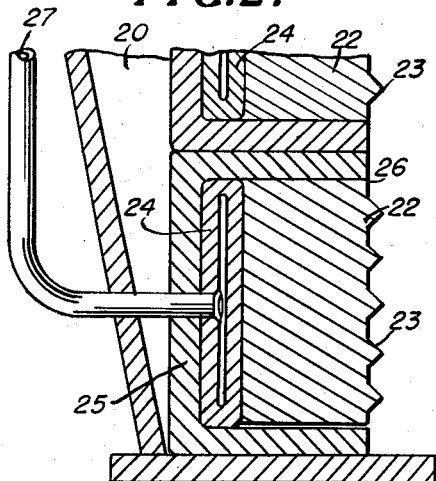
Figure 2 is an enlarged detail sectional view of two of the jack inflatable members shown in Figure 1, in their contracted position.
Figure 3:
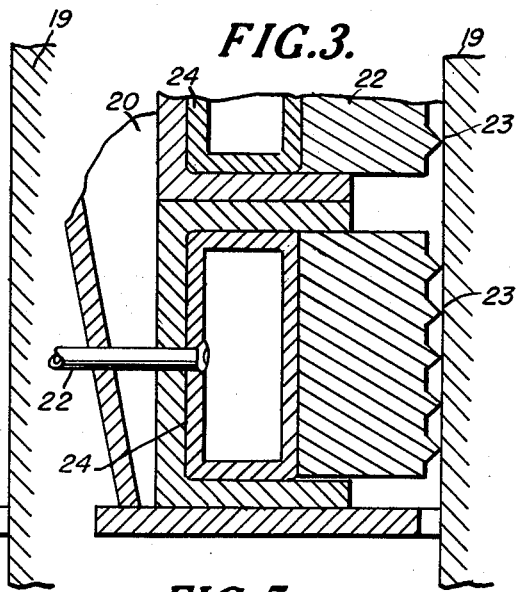
Figure 3 is a view similar to Figure 2 showing the inflatable members in their expanded position.

As particularly shown in Figures 2 and 3, each of the metal face tooth grippers 22 is positioned in front of an inflatable member or rubber expander 24 carried within a metal channel member 25 (Fig. 2). Each channel member 25 has an opened side 26 adjacent the caisson 19, through which a movable gripper shoe 22 projects. The grippers or shoes 22 may be welded or otherwise connected to the inflatable members 24 so as to be moved horizontally or radially therewith when the inflatable members are expanded by introduction of air or other fluid through the branch supply pipe 27 of the main supply line 28 (Fig. 1). The metal grippers 22 are then forced outwardly and the teeth 23 thereof are brought into locking engagement with the wall of the caisson 19 (Fig. 3). Conversely, when each of the inflatable members or rubber tube expanders 24 is deflated or retracted, its associated metal gripper 22 is moved therewith so as to be positioned within the channel member 26 and spaced from the caisson 19.

Figure 4:
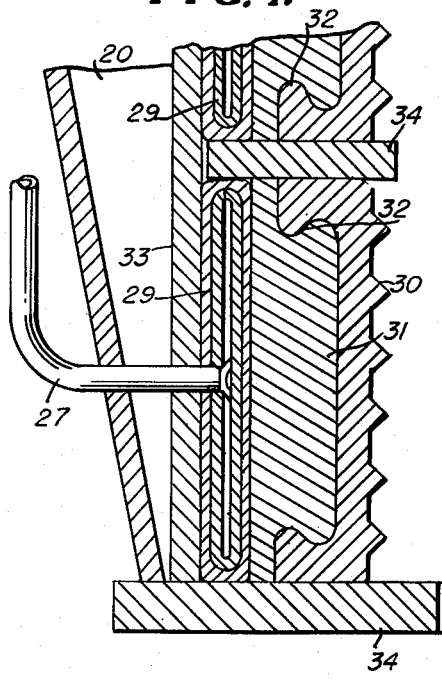
Figure 4 is a view similar to Figure 2 showing a modified form of the inflatable members.
Figure 5:
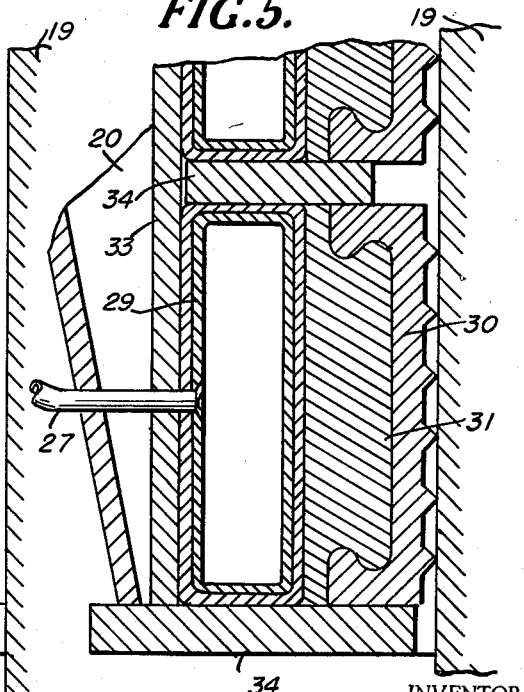
Figure 5 is a view similar to Figure 4 showing the inflatable members in their expanded position.

In the modified form of the invention shown in Figures 4 and 5, each of the inflatable members 29 is of two-ply construction and is operatively connected to a metal face tooth gripper 30 by a solid rubber insert 31 which is vulcanized or otherwise secured to the inflatable member 29 and has its sides formed with reversed or curved portions or projections 32 and 33 which fit into complementary formed recesses in the inner wall of each of the grippers 30. A vertical back plate 33 coacts with spaced horizontal plates or members 34 to form substantially channel-shaped housings in which are movably mounted the inflatable members 29, inserts 31 and grippers 30. These parts are constructed and arranged so as to be capable of withstanding the pressure and strains to which devices of this character are normally subjected when vertically moving either the caisson or the barge. It will be seen that when each of the inflatable members is expanded by introduction of pneumatic or hydraulic fluid pressure through a pipe 27, it will bodily move the gripper 30 outwardly into tight engagement with the wall of the caisson 19 (Fig. 5). Conversely, when the inflatable member is retracted, and collapsed, the gripper 30 will be moved away from the caisson 19.

Figure 6:
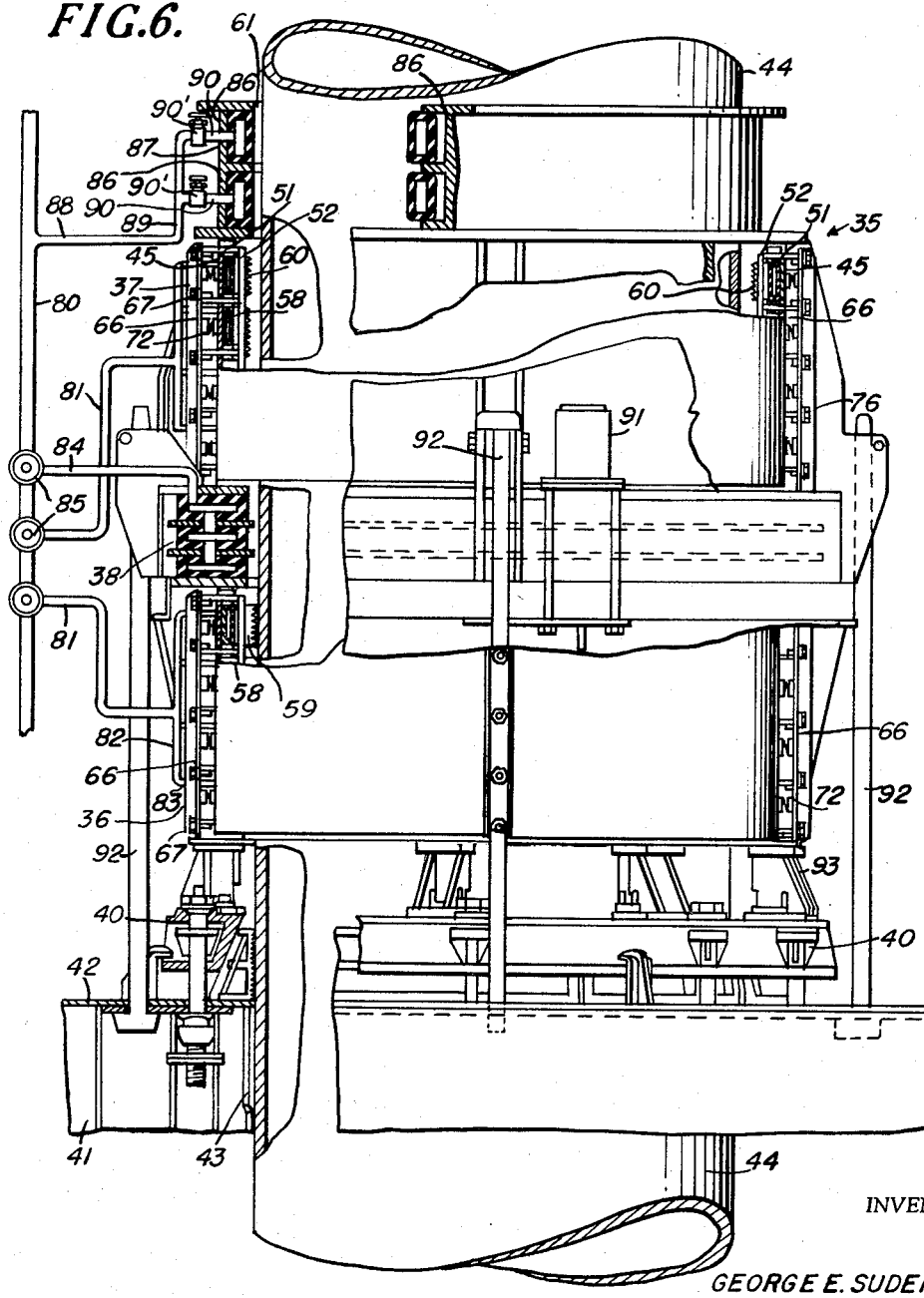
Figure 6 is an elevational view similar to Figure 1 of a further modification of the jack assembly constructed in accordance with the present invention.

In the modification shown in Figure 6, the jack mechanism is provided with yieldable means to assist in retracting each of the inflatable members and the rigid or metal face tooth grippers so as to completely withdraw the latter away from the caisson, and out of the path of its longitudinal axial movement. As shown, the jack mechanism 35 includes a lower gripper assembly 36 and a substantially similar upper gripper assembly 37 in which are mounted the inflatable members and the metal face tooth grippers or shoes subsequently to be described. Between the gripper assemblies 36 and 37 is an intermediate inflatable or bellows assembly 38 for moving the upper and lower gripper assemblies away from each other or in opposite directions when the bellows 38 are expanded. The mechanical wedge gripper and locking assembly 40 is substantially similar to the wedge assembly shown in Figure 1.

Figure 9:
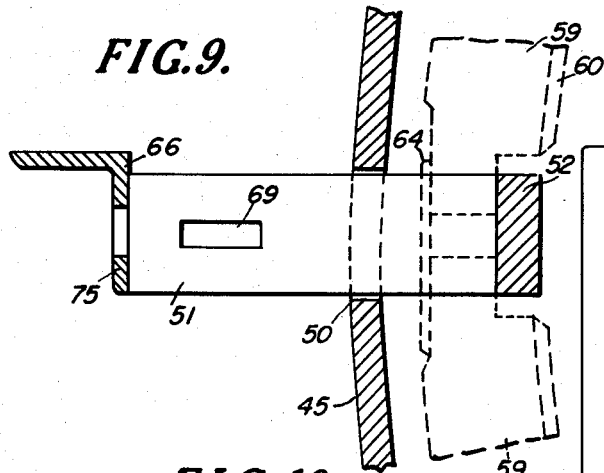
Figure 9 is a sectional view taken substantially along the line 9—9 of Figure 7 with the retaining bolt and nut removed.
Figure 12:
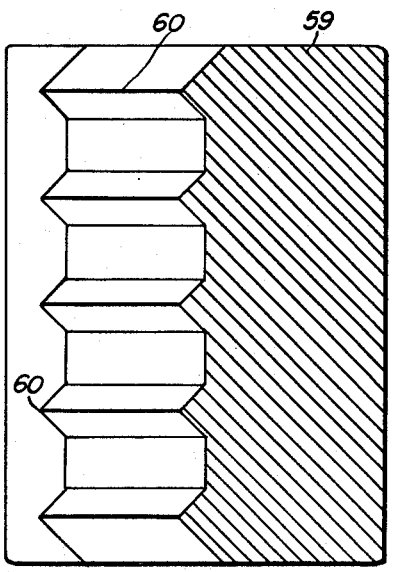
Figure 12 is an enlarged sectional view taken substantially along the line 12—12 of Figure 11.
Figure 10:
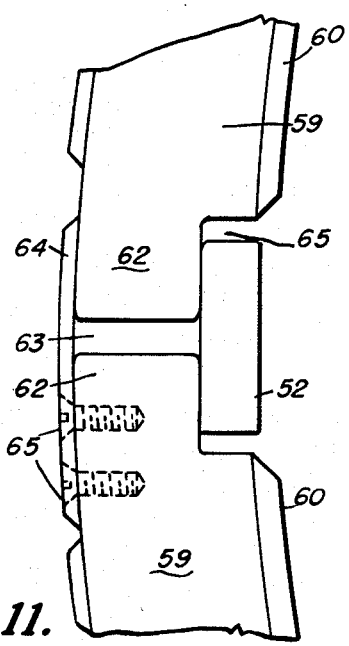
Figure 10 is a detailed plan view showing the connection of adjacent segmental metal face tooth grippers.
Figure 13:
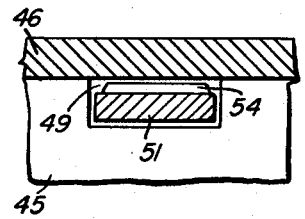
Figure 13 is a sectional view taken substantially along the line 13—13 of Figure 7.
Figure 11:
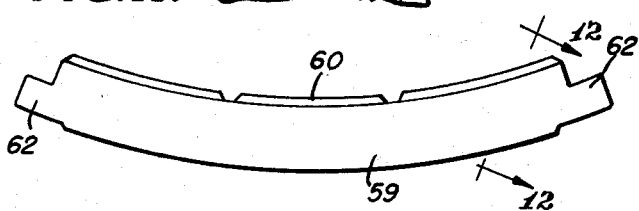
Figure 11 is a detailed plan view of one of the segmental face tooth grippers.
Figure 14:
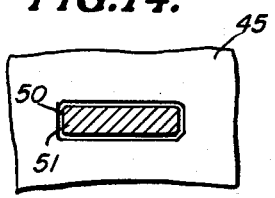
Figure 14 is a sectional view taken substantially along the line 14—14 of Figure 7.
Figure 15:
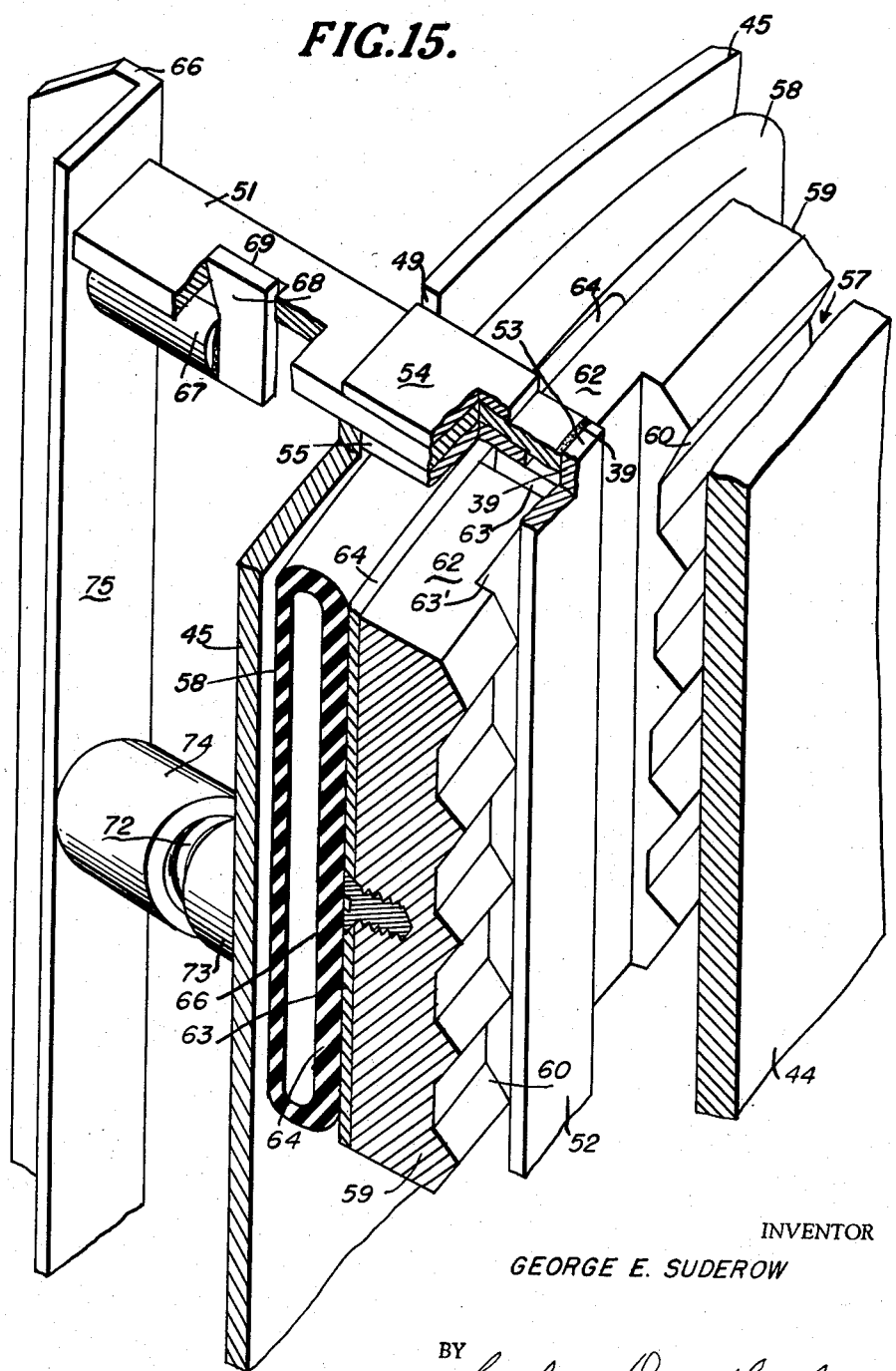
Figure 15 is a detail perspective with parts in section of the jack assembly shown in Figure 8 and with the inflatable members and their associated parts in their retracted positions.

The floating barge 41 is provided with a deck or working platform 42 and has any suitable number of spaced vertical through openings 43 through which extend the caissons or tubular members 44 arranged to be driven into the ground so as to support the barge 41 and its associated parts when the latter is raised above the level of the water. The lower gripper assembly 36 and the upper assembly 37 are similar in construction, shape, and operation and each is formed with a vertical fixed cylindrical shell or housing 45 (Fig. 7) to which is suitably connected at one end a horizontally disposed upper flange or member 46, such as by welding as at 47, and at its opposite end with a bottom horizontal flange or member 48 (Fig. 8). The cylindrical shell 45 has vertically spaced aligned openings which adjacent the upper flange 46 and the lower flange 48 are in the form of recesses or cut-out portions 49 (Fig. 13) and between these recesses, the openings are in the form of transverse slots 50 (Fig. 14). Extending loosely through these openings are horizontally disposed reciprocating bars or plates 51 (Fig. 9) that project from opposite sides of the shell 45. Each of the upper and lower end bars 51 is connected to a vertically disposed retaining member or plate 52 in a manner and for a purpose later to be described (Fig. 15). The upper and lower flanges 46 and 48 extend outwardly beyond the sides of the vertical shell 45 so as to overlap the adjacent bars 51. Each of the end bars 51 has a flat plate 54 of the same width, fixed or welded thereto which extends through a recess 49 so as to coact with a vertically spaced fixed plate 55 for guiding and maintaining the rod 51 in proper position. Each plate 55 is connected to the inner wall of the shell 45 in any suitable manner, such as by welding 39, and extends parallel with the plate 54 to provide a longitudinal passage or space therebetween into which slidably extends a bar 51. Extending outwardly and horizontally from each of the intermediate openings 50 are spaced upper and lower fixed plates 56 similar to the plate 55 and arranged in spaced pairs for slidably receiving and guiding intermediate reciprocating bars 51. The horizontally disposed bars 51 coact with the plates 55 and 56 to separate each of the gripper assemblies 36 and 37 into substantially channel-shaped recesses or chambers 57 in front of the shell 45. In each of the recesses 57 is positioned an inflatable tubular member or rubber expander 58 of such size and shape as to engage the adjacent wall of the shell 45 and the plates 55 and 56. Also mounted in each of the recesses 57 is a segmental or sectional metal gripper or curved block 59 that is positioned in front of the inflatable member 58 (Fig. 15) and is provided on its outer face with the teeth or serrations 60 to provide a roughened surface arranged to be forced into tight frictional engagement with a caisson 44 when the latter is inserted through the opening 61 in the jack assembly 35 which registers with the opening 43 in the barge 41 (Fig. 6). The metal tooth grippers or shoes 59 may be made of other suitable hard, durable materials and are formed at their ends with reduced shoulder portions 62 (Fig. 15) which are circumferentially spaced from each other, as at 63 (Fig. 10) so as to be independently circumferentially and radially movable between the caisson 44 and the shell 45.

The adjacent reducing ends 62 of the segmental grippers 59 provide an inwardly disposed recess 63' which receives the vertical retaining member 52 so that the same does not extend outwardly beyond the teeth 60 (Fig. 10) but overlaps the inner sides of the ends 62 of adjacent gripper sections 59, in order to control the radial or lateral movement thereof. Each of the vertical plates 52 is substantially the same width as the horizontal bars 51, and are connected at their points of abutment in any suitable manner, such as by welding 39 (Fig. 7). Thus, it will be seen that horizontal or lateral movement of the bars 51 will cause simultaneous movement of their associated inner plates 52. A retaining plate 64 overlaps the outer surface of the end portion 62 of adjacent gripper sections 59 (Fig. 10) and coacts with the plate 52 to provide means for movably maintaining the sections 59 of the gripper in proper position during the operation of the jack. One side of the outer plate 64 is connected by the screws 65 to a gripper section 59 while the opposite side loosely engages the adjacent gripper section to allow independent circumferential movement of the sections as they are advanced or retracted from engagement with the caisson 44. An angulated vertically disposed movable bar 66 substantially the same length as the retaining member 52 is connected to the inner end of each of the bars 51 in any suitable manner, such as by the adjustable threaded bolts 67. Each of the bolts 67 has a laterally extending tapered portion or head 68 arranged to extend into a complementary elongated slot 69 (Fig. 15) in the rod 51 so as to be detachably connected thereto. A threaded nut 70 is connected to the bolt 67 and is spaced from the angle bar 66 by a washer 71.

In order to withdraw the teeth of the segmental or sectional face grippers 59 away from the caisson 44 when the inflatable members 58 are deflated, yieldable means in the form of coil expansion springs 72 are positioned between the stationary shell 45 and the movable angle bar 66 (Fig. 8). The fixed end of each spring 72 is suitably connected to the shell 45 and may be enclosed in a housing 73. The opposite end of each spring is similarly enclosed in a housing 74 connected to the arm 75 of the angulated or L-shaped bar 66. A threaded adjusting bolt 76 is connected to a plunger plate or disc 77 in the housing 74 for controlling the compression of the spring 72 and may be held in adjusted position by a clamping nut 78 and a jam nut 79 (Fig. 8).

Fluid, such as gas, air, or the like, under pressure, may be supplied selectively to the inflatable members 58 carried by the lower and upper gripper assemblies 36 and 37, through the main supply pipe 80 (Fig. 6) which communicates with spaced flexible pipes 81, that in turn communicate with pipes 82 having branch pipes 83 corresponding in number to the number of inflatable members. Each of the pipes 83 communicates with one of the inflatable members for expanding the same. The intermediate bellows or inflatable assembly 38 that is operated to move the lower and upper assemblies away from each other and in opposite directions, is controlled by a supply pipe 84 communicating with the main supply 80. The flow of the fluid of the inflatable members may be individually and manually controlled by the valves 85 or operated selectively from a master control located at a convenient point on the barge. While each of the gripper assemblies 36 and 37 is shown provided with four metal face tooth grippers or shoes, the number of such tooth grippers may be varied as the particular operating conditions may require.

Associated with the jack mechanism may be one or more inflatable members or rubber expanders 86 (Fig. 6), two of which are shown for the purpose of illustration. The inflatable members 86 are carried by channel-shaped cylindrical members 87 positioned above the gripper assembly 37. Each of the members 86 communicates with the main supply 80 through a pipe 88, that in turn communicates with a pipe 89 having spaced branch connections 90 communicating with each of the inflatable members 86. Each of the arms 90 is provided with a valve 90' for selectively and independently controlling the flow of the fluid to the inflatable members 86. Each of the inflatable members 86 is arranged, when expanded, to be brought into tight frictional engagement with the adjacent outer surface of the caisson 44 and be released therefrom when deflated. The inflatable members 86 are provided for the purpose of holding the caissons 44 while being towed and until each caisson is dropped to engage the marine ground. In this connection, it might be noted that when the caissons are being floated to the point of use, they have a tendency to move in the jacks due to the wave action and vibration of the barge. Consequently, if these caissons are held when being transported by the metal face tooth grippers 59, the movement imparted to the caissons might cause slippage and damage to the caissons. Moreover, the engagement of the teeth of the grippers during such movement would tend to lessen their gripping efficiency when used to move either the caissons or the barge vertically relative to each other. In other words, by providing the inflatable members 86 for releasably holding the caissons in position when the jack is not in use, the danger of damaging the metal face tooth grippers is eliminated. Each of the inflatable members 86 is of such size and shape as to provide a wide bearing surface for engaging the caisson 44 when moved into contact therewith, regardless of the position or movement of the jack assemblies 36 and 37. When the jack is in operation, the inflatable members 86 are moved to their retracted positions and are only used for holding the caissons when the barge or working platform is being transported from place to place and prior to lowering or dropping the caissons to engage the marine ground. The jack mechanism is provided with the usual retracting jacks 91 (Fig. 6), connecting bolts 92, and the circumferentially spaced supporting plates 93.

In operation, the caissons or supporting columns 44 are initially carried in their raised position, by the barge 41 to the drilling site, by engagement of the inflatable members 86 with the caissons 44. The metal face tooth grippers 59 are all now in their retracted positions and out of engagement with the caissons. When the point of operation is reached, the inflatable members or rubber expanders 86 are deflated allowing the caisson to drop and engage the marine ground. The jack mechanism may then be brought into operation so as to raise the barge 41 above the level of the water and be supported by the caissons, that are now in engagement with the marine ground, by the selective actuation of the gripper assemblies 36 and 37 and the intermediate bellows 38. As particularly shown in Figure 7, the inflatable member 58 of one of the gripper assemblies is shown in its expanded position so as to move its associated metal face tooth gripper 59 into firm frictional engagement with the adjacent surface of the caisson 44. When it is desired to release the metal face tooth gripper 58 from contact with the caisson 44, each of the inflatable members 58 is deflated so as to assume the position shown in Figure 8. At the same time, the expansion pressure of the springs 72 is now sufficient to bodily move the metal face shoes 59 out of contact with the caisson 44. The outward movement imparted to the spring 72 simultaneously moves the angulated bar 66 away from the shell 45 and as the bar 66 is connected by the plates 51 and 52 to the metal face grippers 59, these parts are also moved horizontally away from the caisson 44. Thus, it will be seen that the efficient and positive means are provided for insuring the insertion of each caisson into the jack assembly without danger of mutilating either the caisson or the teeth 60 of the grippers. The tension of each of the expansion springs 72 may be varied or controlled by adjusting the nut 76. The fixed connection of the plates 64 with one end of each of the segmental grippers 59 by the screws 65 and the loose connection of each of the plates 64 with an adjacent gripper section (Fig. 10) provide means for allowing the separate and independent movement of each of the segmental grippers into and out of engagement with the caisson 44. At the same time, the vertical inner plates 52 coact with the outer plates 64 to insure simultaneous movement of the gripper sections when the plates 51 are moved horizontally into engagement with the caisson by expansion of the inflatable members 58. Also, the withdrawal of the gripper sections from the caisson when the pressure in the inflatable members is released and the tension of the spring 72 causes movement of the bars 51 to simultaneously retract the gripper sections away from the caisson. It will be observed that the vertical plates 52 are positioned so as not to interfere with the operation of the gripper sections when moved into or out of engagement with the caisson. In other words, the plates 52, while simultaneously movable with the bars 51, also constitute stops for limiting the expansion of the inflatable members 58. When the members 58 are deflated, the outward movement imparted to the bars 66 by the expansion of the springs 72 also causes the bars 52 to move the gripper section 59 away from the caisson 44 (Fig. 8).

It will be understood that the forms of the invention shown are merely illustrative and that such changes may be made as come within the scope of the following claims.

I claim:

1. A gripper assembly for use in a jack mechanism of the class described including in combination: a cylindrical shell housing having spaced, longitudinally aligned slots; radially disposed, movable bars extending loosely through said slots; circumferentially spaced, segmental rigid grippers movable radially in said housing and having teetth arranged to engage a column inserted through said housing; an inflatable member between said housing and said grippers for forcing the latter against the column when said inflatable member is inflated; means connecting said movable bars to said grippers for radial movement therewith toward the column; longitudinal members connected to said bars outwardly of said housing; means for inflating said inflatable member to force said grippers into engagement with the column; and resilient means operatively interposed between said longitudinal members and said housing for moving said grippers away from the column when said inflatable member is deflated.

2. A gripper assembly for use in a jack mechanism of the class described including in combination: a cylindrical shell housing having spaced, longitudinally aligned slots, said housing being adapted to have a column inserted therethrough; spaced cover plates extending inwardly from said housing adjacent said slots and separating the interior of said housing into longitudinally spaced gripper compartments; radially disposed reciprocating bars extending loosely through said slots to project from opposite sides thereof; inflatable members in said compartments; circumferentially spaced, rigid, segmental grippers on the inner side of said inflatable members, each of said grippers having teeth engageable with the column to restrain relative movement between the latter and said housing in either direction longitudinally of the column on radial movement of said grippers into engagement with the column; means operatively connecting said bars to said grippers so as to be movable radially with the latter toward the column; means for introducing fluid under pressure into said inflatable members to force said grippers into engagement with the column; and resilient means connected to said reciprocating bars outside of said housing for moving said grippers away from the column when said inflatable members are deflated.

3. A gripper assembly for use in a jack mechanism of the type described comprising: a rigid annular member adapted to surround a column and having a radially inwardly facing channel therein; an inflatable member disposed in said channel; circumferentially spaced rigid grippers disposed in said channel radially inwardly of said inflatable member, said grippers having teeth thereon for engagement with the column to restrain relative movement between said rigid annular member and the column in either direction longitudinally of the latter when said inflatable member is inflated to force said grippers into engagement with the column, said grippers having reduced end portions defining recesses opposed to the column; a longitudinal retaining member positioned in each of said recesses and overlapping said reduced ends of adjacent grippers; longitudinally spaced, radially disposed bars connected to said retaining members; means for selectively introducing or exhausting fluid pressure into or from said inflatable member; and spring means operatively connected to said bars and to said rigid annular member for moving said grippers radially outwardly from the column when said inflatable member is deflated.

4. In a jack mechanism mountable on a platform for selectively effecting or restraining substantially vertical relative movement in either direction between the platform and a supporting leg therefor, the combination comprising: a rigid structure having at least two spaced recesses therein opposed to the supporting leg; inflatable elements disposed in said recesses, one of said elements having a smooth surface opposed to the supporting leg for engagement therewith to restrain relative movement between said structure and the leg in either direction longitudinally of the latter on inflation of said one element; a rigid member interposed between the other of said elements and the supporting leg, said rigid member having teeth thereon engageable with the leg for restraining relative movement between said structure and the leg in either direction longitudinally of the latter on inflation of said other element; and means for selectively inflating or deflating said inflatable members independently of each other.

References Cited in the file of this patent

UNITED STATES PATENTS

| | | |
|---|---|---|
| 103,899 | Lewis | June 7, 1870 |
| 1,586,923 | Townsend | June 1, 1926 |
| 1,649,674 | Egan | Nov. 15, 1927 |
| 1,895,132 | Minor | Jan. 24, 1933 |
| 2,322,739 | Vanderzee | June 22, 1943 |
| 2,323,091 | Johnston et al. | June 29, 1943 |
| 2,382,958 | Burgoine | August 21, 1945 |
| 2,394,785 | Kindervater | Feb. 12, 1946 |
| 2,396,413 | Egger | Mar. 12, 1946 |
| 2,534,527 | Myers | Dec. 19, 1950 |
| 2,715,432 | Gunther | Aug. 16, 1955 |
| 2,755,869 | Pointer | Jan. 1, 1957 |